July 7, 1936.　　　R. ULRICH　　　2,046,801
PRESSURE GAUGE
Filed Sept. 22, 1934
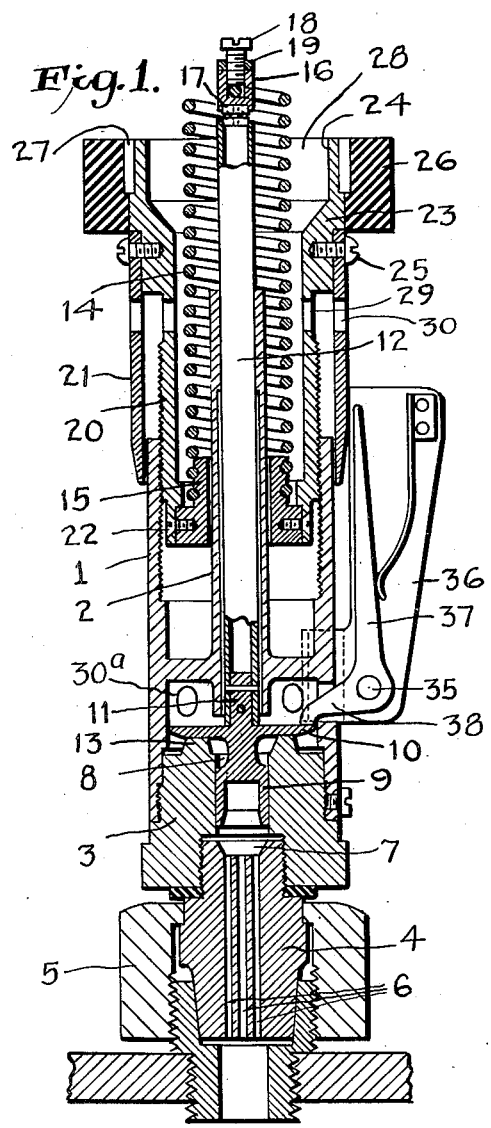
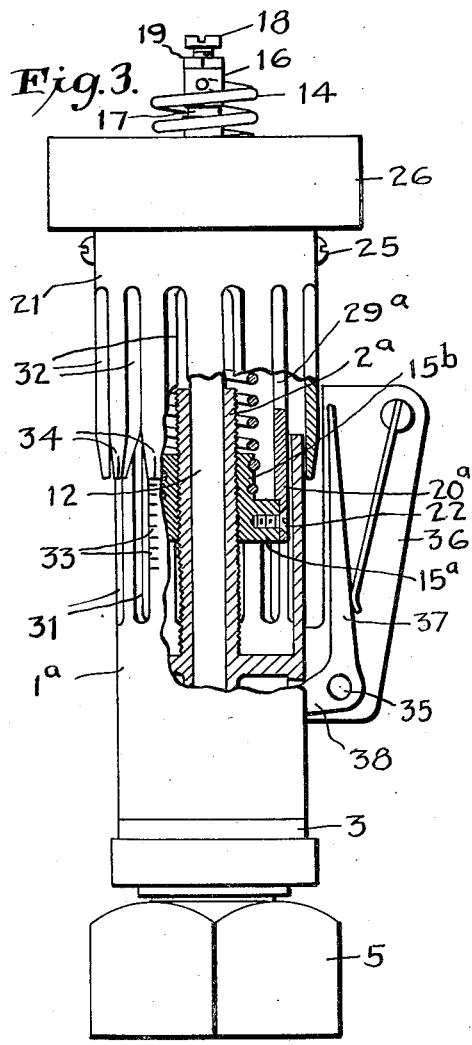
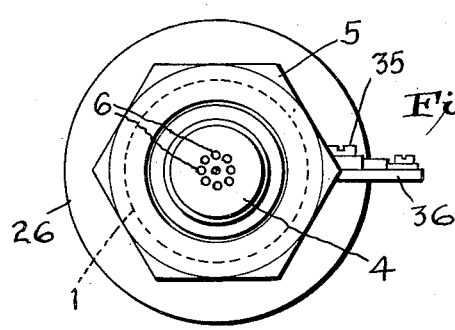
INVENTOR
Rudolf Ulrich
BY
A. J. Pritchard
ATTORNEY Patented July 7, 1936

2,046,801

UNITED STATES PATENT OFFICE 2,046,801

PRESSURE GAUGE

Rudolf Ulrich, Pittsburgh, Pa.

Application September 22, 1934, Serial No. 745,053

5 Claims. (Cl. 73—111)

My invention relates to improvements in gauges for measuring and indicating variable pressures and, more particularly, to improvements in pressure gauges for measuring the maximum pressure of cyclically recurring pressure fluctuations, such as, for example, the compression pressure and the explosion or combustion pressure developed in the cylinders of internal combustion engines and the like.

It is an object of the invention to provide an indicator of the class described of increased sensitivity and improved accuracy, as well as durability, efficiency in operation and convenience in handling.

It is another object of the invention to provide a pressure gauge of this nature so constructed and arranged as to effect a more constant spring rate with respect to load and with respect to temperature changes under load, and to minimize the inertia and friction forces of the moving masses upon the pressure measuring element to render the device capable of registering accurately at high engine speeds.

Another object of the invention is to provide an arrangement whereby the effects of high temperature on the spring resisting system, are abated.

Other objects and advantages will more fully appear as the description proceeds.

Referring now to the drawing, which accompanies and forms part of this specification:

Figure 1 is a longitudinal cross-sectional view.

Figure 2 is a bottom plan view of the gauge shown in Figure 1, and,

Figure 3 is an elevation, partly broken away to illustrate a modified form of the invention.

It will be readily appreciated, that the magnitude and uniformity of the pressures developed in the cylinders are factors of foremost importance in the performance of an internal combustion engine. This is especially so with engines of the Diesel type. In a Diesel engine, for example, a drop in the pressure developed either by compression or combustion, or a difference in these pressures between the various cylinders, which, in either case, need only be comparatively small, will decrease the efficiency of the engine and often introduce harmful effects.

Prior indicating devices of the class described invariably employ a spring of the compression type. It has been found in practice that certain disadvantages arise from the use of a compression spring in instruments of this nature. Under load a compression spring is likely to buckle and be eccentric in action, thus introducing a variation in the desired stress-strain ratio, whereby the deflection of the spring will not be uniform with respect to load. This condition is particularly pronounced with the long slender spring generally employed because its deflection is greater and consequently more readily measurable than that of a short and stiff spring, which would be less liable to buckle. Under stress the effective length of a compression spring, such as heretofore used, is also likely to decrease and result in a further deviation from uniform rate with respect to load. Another undesirable feature of a device using a compression spring is, that the spring is usually adjacent to or seated on the piston close to the zone of the abnormal temperatures of the engine cylinder. With increasing temperature the modulus of elasticity of the spring will decrease and bring about a further departure from straight line rate and the change in length of the spring with change in temperature will also affect the accuracy of the indicated reading. Again, if a compression spring is eccentric in its behavior, an oblique motion is imparted to the piston. The severe friction thus developed also affects the sensitivity and accuracy of the indicator.

The disadvantages enumerated above are, for the most part, eliminated by the arrangements herein shown and now about to be described.

In accordance with my invention, there is provided a casing or barrel, which carries a cylinder for communicably connecting the device with a pressure chamber. Fitted in the cylinder is a piston, which is connected with a force transmitting element. The latter at its upper end is connected with the upper end of a helical tension spring, whereby the piston is adapted, under the influence of fluid pressures, to extend the spring in an outward direction. The lower end of the spring engages means whereby it is connected with an index sleeve rotatable about and movable axially along the casing of the gauge. By rotating the sleeve, the spring can be extended in the opposite direction to pull down on the transmitting element, which, in turn, depresses the piston, until equilibrium is established.

In the embodiments of the invention illustrated a body member is bored to provide an outer casing 1 and a central guide tube 2. In the form shown in Figure 1, casing 1 is internally threaded at its upper and lower ends and threaded into the lower end is a cylinder 3. The lower wall of the bore of cylinder 3 is threaded to receive the external thread of a cone 4. The latter carries a union nut 5 or other suitable connecting means and is also provided with spaced, longitudinally-extending ducts 6, which communicate with a flared opening provided in the cone, at 7; the latter, in turn, registering with the bore 8 of the cylinder 3. Slidingly fitting bore 8 of the cylinder is the working piston 9 of the gauge.

Piston 9 is adapted, as will be understood, to be actuated by fluid pressures and the forces so acting are, in turn, transmitted by means including a tubular element, to the upper end of a helical tension spring.

In the examples shown, the piston is provided with an annular flange or disc portion 10 and terminates in a vertical stem 11. The latter is received within the guide tube 2 and there pinned to the lower end of a tubular lifting rod 12.

Disc 10 of the piston is adapted to cooperate with fixed abutting means for limiting the reciprocal movements of the piston. As shown, these means comprise the lower surface of the guide tube 2 and an annular boss 13 formed on the upper surface of cylinder 3.

Within the casing 1 is a helical tension spring 14, which, at its upper end, is connected with the upper end of the tubular rod 12, and, at its lower end, engages means for connecting it with an element operable for rotation about and axial movement along the casing 1.

Spring 14 is arranged within the casing coincident with the axis of the rod 12 and any suitable means can be employed to connect the rod to the spring. For example, as in the form shown, the upper extremity of the spring is received in an aperture provided in a headpiece 16 which, by means of a ball-bearing thrust connection 17 is swiveled to the upper end of the rod 12. Head 16 is, preferably, threaded and a screw 18 is fitted thereon to prevent displacement of the spring from the member 16. Screw 18 is provided with a lock-nut 19.

In the embodiments illustrated the lower end of spring 14 preferably engages a footpiece or calibrator 15. The latter surrounds guide tube 2 and is arranged adjacent the upper end of casing 1. Footpiece 15, together with a coupling or guard sleeve 20 serve to connect the lower end of spring 14 with an index sleeve 21. The footpiece is secured to the guard sleeve as by screws 22 and the sleeve, near its upper end, is formed to provide an enlarged shoulder 23, terminating in an annular ring 24. Screws 25 secure the index sleeve to the coupling sleeve 20 and a milled ring 26 fitted about the annular ring portion 24 of the sleeve 20, is fastened to the sleeve by pins 27. The shoulder portion 23 spaces the sleeves 20, 21, apart and in this space the upper end of the casing 1 is received. In the form shown in Figure 1 sleeve 20 is externally threaded to fit the thread provided in the upper inner surface of casing 1, whereby the sleeves can be moved axially along the casing.

Spring 14 is enclosed substantially throughout its length by the coupling or guard sleeve 20. The bore of the body portion of the sleeve provides an air chamber about the spring and leads into a cup or funnel opening in the top of the sleeve formed by the shoulder and ring portions 23, 24. The emergence of the upper portion of the spring is thus permitted. Also, by this arrangement a large supply of cooling air can continuously flow to and circulate about the spring.

Air for cooling the spring can also flow through the indicator by means of circumferentially spaced, registering openings provided in the index and coupling sleeves at 30, 29, respectively. Casing 1 can also be provided, as indicated at 30a, with circumferentially spaced vent holes serving for the escape of hot gases from the interior of the indicator.

In Figure 3, illustrating a modified form of the invention, like reference numerals indicate parts similar to those heretofore described.

The body member, as before, is machined to provide an outer casing 1a and an inner central guide tube 2a. A cylinder 3 is threaded into the lower portion of the casing for connecting the gauge with an engine cylinder. Coupling sleeve 20a, in this form of the invention, is not threaded into the upper end of the casing but has a sliding fit therein. The coupling sleeve is secured as before, by screws, to an index sleeve 21 and to a footpiece or calibrator 15a, the latter engaging the lower coils of helical tension spring 14. As shown guide tube 2 is externally threaded and the footpiece surrounding the guide tube is internally threaded to fit the thread of the tube, whereby upon rotation of the index sleeve the coupling sleeve and footpiece are rotated and the sleeves and footpiece travel axially along the casing.

With the above described arrangement a more effective manner of cooling the spring and dissipating the hot gases is provided for. The casing 1a, as shown, is provided at 31 with a plurality of slots which are spaced circumferentially about the casing and extend a substantial part of its length. The index sleeve 21 and coupling sleeve 20a are also each provided with a series of circumferentially spaced, longitudinally-extending slots indicated at 32, 29a, respectively. The slots in the sleeves are in registering relation and both are adapted to register with the slots provided at 31 in the casing.

Any suitable indicating arrangement may be provided for the gauge. As shown, the casing carries axially spaced graduations at 33 for indicating equal increments of load and the index sleeve, adjacent its lower edge is provided with a co-operating, circumferentially arranged set of graduations 34, representing fractional divisions of the axial scale. Also, there is preferably provided the usual vibrating needle which is adapted to respond to fluctuations of the piston. This indicating means can be actuated by the piston or the transmitting element actuated thereby and can be mounted at any suitable place on the gauge. As shown the needle is adapted to operate before a bracket plate 36 attached to the side wall of the casing. The needle is pivoted on the bracket plate 36 as by pivot 35 and comprises a long arm 37 which serves as the indicator and a short arm 38 which, in this instance, passes through the casing and rests on the annular disc 10 of the piston 9.

In gauges of the class to which this invention relates numerous desirable effects are obtained from the arrangements herein described. Buckling or decrease in effective length of the spring under load, is avoided through the use of a tension spring, which more nearly approaches uniform rate of deflection with respect to load. The accuracy of devices of this class is thus improved. The action of the tension spring being more nearly parallel to the axis of the helix, oblique motion of the piston does not occur. A considerable reduction in friction is achieved and the sensitivity and accuracy of the device is further improved. The tension spring can be positioned remote from the zone of highest temperatures. This arrangement, together with the means for admitting cooling air to the interior of the indicator, reduce to a substantial degree the undesirable effects of change of length and change of modulus of elasticity of the sping with change of temperature.

In operation, as is understood, the pressure developed in an engine cylinder acts on the piston of the indicator, the reciprocal movements of which are limited as has been described. The fluctuating movements of the piston will cause the indicator needle to vibrate and as the index sleeve is rotated the spring will be extended until its tension balances the pressure exerted by the fluid on the piston, at which time the needle will cease to vibrate. The index sleeve can then be reversed slightly until the needle again begins to quiver, and then the sleeve is advanced again a trifle to bring the needle to rest, at which time the reading is taken.

Having thus described the invention, its advantages and operation, it will be understood that various changes may be made in the form and arrangement of the several elements, in carrying the invention into effect, without departing from the principle of the invention.

What I claim is:

1. A pressure gauge comprising a casing, a cylinder carried by the casing and adapted to be communicably connected with a pressure chamber, a piston fitting the bore of the cylinder, a rod detachably engaged at its lower end with the piston, a helical tension spring arranged coincident in axis with the rod, means connecting the upper ends of the spring and rod, a footpiece engaging the lower end of the spring, a rotatable index sleeve encircling the casing, an inner sleeve rotatable with and connecting the index sleeve with the footpiece, said inner sleeve being adapted to permit emergence of the spring, and means adapted, upon rotation of the index sleeve, to move said sleeves and footpiece axially and deflect the spring.

2. A pressure gauge comprising a casing threaded internally at its upper and lower ends, a cylinder threaded into the lower end of the casing and adapted to be communicably connected with a pressure chamber, a piston fitting the bore of the cylinder, a rod detachably engaged at its lower end with the piston, a helical tension spring arranged coincident in axis with the rod, means connecting the upper ends of the spring and rod, a footpiece engaging the lower end of the spring, a rotatable index sleeve encircling the casing, and an inner sleeve connecting the index sleeve with the footpiece, said inner sleeve being threaded into the upper end of said casing, whereby rotation of the index sleeve effects axial movement of said sleeves and footpiece to deflect the spring.

3. A pressure gauge comprising a casing formed with a central guide tube threaded externally, a cylinder carried by the casing and adapted to be communicably connected with a pressure chamber, a piston fitting the bore of the cylinder, a rod arranged in the guide tube and detachably engaged at its lower end with the piston, a helical tension spring arranged coincident in axis with the tube, means connecting the upper ends of the spring and rod, a footpiece threaded on the guide tube and engaging the lower end of said spring, a rotatable index sleeve, and an inner sleeve connecting the index sleeve with the footpiece, said sleeves being each provided with circumferentially spaced, longitudinally-extending slots arranged in registering relation, and said casing being provided with a series of longitudinally extending slots adapted to register with the slots in said sleeves.

4. A pressure gauge comprising a casing, a cylinder carried by the casing and adapted to be communicably connected with a pressure chamber, a helical tension spring arranged to extend within the casing, a piston fitting the bore of the cylinder, a tubular member, said member being detachably engaged at its lower end with the piston and being fastened at its upper end to the upper end of the spring, said member being thereby adapted to transmit to the spring, pressure exerted against the piston, a footpiece engaging the lower end of the spring, and an index sleeve rotatable about and movable axially along the casing, said sleeve being operatively associated with and adapted to move said footpiece axially to extend the spring, to balance pressure exerted against the piston.

5. A pressure gauge comprising a casing, a cylinder carried by the casing and adapted to be communicably connected with a pressure chamber, a helical tension spring arranged to extend within the casing, a piston fitting the bore of the cylinder, a member arranged within and extending longitudinally of the casing, said piston being operatively associated with said member at its lower end and the upper end of the member being fastened to the upper end of the spring, said member being thereby adapted to transmit to the spring, pressure exerted against the piston, a sleeve encircling the casing, and means operatively associating the sleeve with the lower end of the spring, said sleeve being movable axially along the casing to transmit axial movement to the lower end of the spring, whereby the spring is extended.

RUDOLF ULRICH.